United States Patent [19]

Boyce

[11] Patent Number: 4,750,216
[45] Date of Patent: Jun. 7, 1988

[54] VIDEO COUPLER DEVICE

[75] Inventor: David E. Boyce, Parrish, N.Y.

[73] Assignee: General Electric Company, New York, N.Y.

[21] Appl. No.: 793,426

[22] Filed: Oct. 31, 1985

[51] Int. Cl.$^4$ .............................................. H04B 9/00
[52] U.S. Cl. ................................... 455/617; 250/551; 455/602; 455/606; 455/619
[58] Field of Search ............... 307/311; 250/239, 551, 250/206, 214 A; 455/602, 619, 617, 607, 606; 330/59, 288, 308, 293

[56] References Cited

U.S. PATENT DOCUMENTS

| 4,104,533 | 8/1978 | Iverson | 250/551 |
| 4,282,604 | 8/1981 | Jefferson | 455/602 |
| 4,446,375 | 5/1984 | Aird | 250/551 |
| 4,567,446 | 1/1986 | Konishi | 330/308 |

OTHER PUBLICATIONS

Microelectronic Circuits, Sedra et al, p. 37 ©1982.

Advanced Technology, Integrated Optoelectronics, Bar-Chaim et al, pp. 38-46 ©1982.
High Speed Optocouplers—Hewlett Packard Data Sheet for the GN136.
Photon Coupled Isolator—General Electric Data Sheet for the H11N1.
John Soluk, "Add A Video Input To Your TV," Apr. 1983, *Radio-Electronics*, pp. 43-48.

*Primary Examiner*—Robert L. Griffin
*Assistant Examiner*—Leslie Van Beek
*Attorney, Agent, or Firm*—Stanley C. Corwin; Birgit E. Morris; Henry I. Schanzer

[57] ABSTRACT

A video coupler device capable of providing high effective electrical isolation between an analog video signal source system and a signal receiving system is disclosed. The device includes a high-speed LED and a high-speed, linear, integrated circuit. The integrated circuit includes a photodiode, an input current amplifier and an output transimpedance amplifier. The resultant video coupler exhibits a high degree of linearity and stability at a low cost, while requiring minimal external circuitry to handle standard video signals.

8 Claims, 1 Drawing Sheet

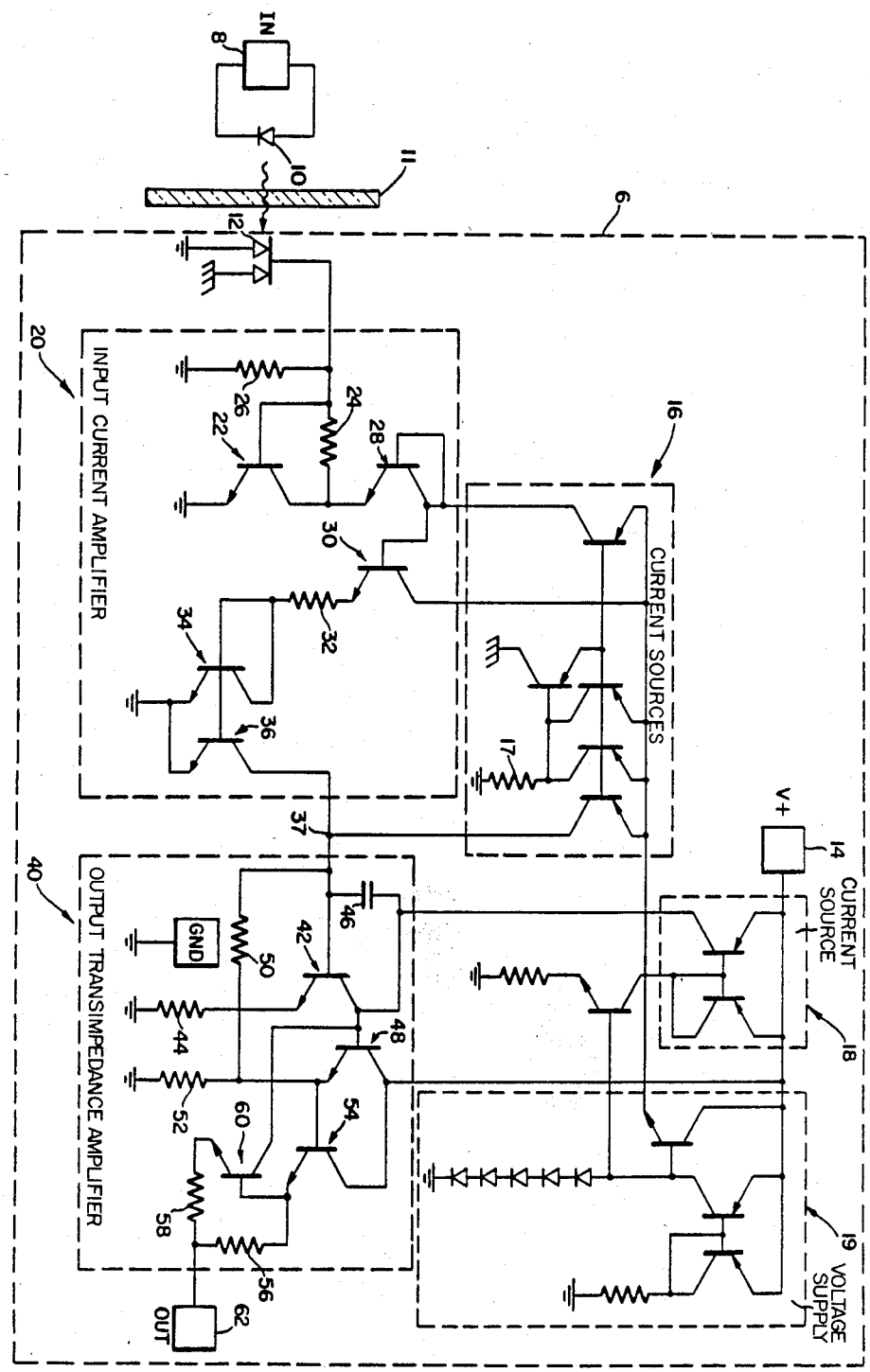

VIDEO COUPLER DEVICE

The present invention relates in general to optical isolators and in particular to optical isolators for coupling video or other wideband analog signals between a signal source system and a signal receiving system.

BACKGROUND OF THE INVENTION

Home television receivers generally do not have a power isolation transformer because of cost considerations and therefore they have a ground system which is connected directly to the AC power supply. This presents a problem for connecting a home TV to a home computer, video game, or other video signal source system which requires isolation from the AC power supply. Optical isolation of the signal source and receiving systems is one solution, but coupling of video signals is difficult because the signal carries a large amount of information and therefore requires a wideband coupler. It is important that a video coupler be adapted to receive industry standard signals and provide an output signal which complies with those standards.

Present techniques of video coupling include the use of a wideband signal transformer, the use of an integrated coupler device such as the Hewlett-Packard 6N136 plus amplifiers using discrete circuitry components, and the use of an isolating power transformer in the TV display. As mentioned above, the use of a wideband transformer adds materially to the cost of the TV set. Further, the bandwidth over which such transformers can operate efficiently is generally insufficient to the demands of the situation. Finally, the use of discrete circuit components has a number of problems associated with it, such as relatively high assembly costs, noise pickup, limited bandwidth, and instability due to parasitic capacitances.

OBJECTS OF THE INVENTION

It is therefore a primary object of the present invention to provide a video coupler which is not subject to the foregoing problems and disadvantages.

It is another object of the present invention to provide a new and improved video coupler capable of coupling a wideband analog video signal between a signal source system and a signal receiving system while providing effective electrical isolation therebetween.

It is a further object of the present invention to provide a new and improved video coupler having high linearity of response.

It is still another object of the present invention to provide a new and improved video coupler which requires low operating current and voltage.

It is yet another object of the present invention to provide a new and improved video coupler requiring minimal additional circuitry for operation.

It is still a further object of the present invention to provide a new and improved video coupler at reduced cost.

It is yet a further object of the present invention to provide a new and improved video coupler having high stability.

It is still another object of the present invention to provide a new and improved video coupler capable of receiving industry standard signals and providing industry standard output signals in response thereto.

These and other objects of the present invention, together with the features and advantages thereof, will become apparent from the following detailed specification, when considered in conjunction with the accompanying drawing.

SUMMARY OF THE INVENTION

The foregoing objects of the invention are achieved by means of an optical isolator which combines a high-speed, light-emitting diode (LED) and a high-speed, linear, light sensitive integrated circuit. More specifically, the invention is directed to a video coupler which combines the functions of light emission, light detection and signal amplification, the last two functions being performed by an integrated circuit. The integrated circuit includes a large-area, high-speed photodiode, an input current amplifier and an output transimpedance amplifier. The LED and integrated circuit are mechanically coupled, preferably by means of a folded lead frame construction to form a common package, while maintaining electrical isolation therebetween. The video coupler of the invention thus exhibits a high degree of linearity and stability at a low cost, while requiring minimal external circuitry to handle standard video signals and providing effective electrical isolation.

BRIEF DESCRIPTION OF THE DRAWING

The sole figure of the drawing is a schematic diagram showing the details of the integrated circuit constructed in accordance with a preferred embodiment of the present invention.

DETAILED DESCRIPTION OF THE INVENTION

Referring now to the drawing, an analog video signal from a signal source system is applied by way of an input terminal 8, to a high-speed light-emitting diode (LED) 10, which may be of the type JS-4693AS,GE commercially available from Toshiba. Such LEDs require only a few milliamperes of drive signal current. The light-emitting diode is mechanically coupled to the integrated circuit 6, which comprises the remainder of the Figure shown in the drawing. The mechanical coupling is preferably implemented by means of a folded lead frame construction so as to form a common package. An example of such a construction is shown in U.S. Pat. No. 4,446,375, which is assigned to the assignee of the present invention.

The optical signal from light-emitting diode 10, representative of an analog video signal, derived from signal source system 8, is transmitted through a glass screen 11 which provides electrical isolation and is detected by a high-speed photodiode 12 which produces a photocurrent proportional to the video signal. Photodiode 12, which is located on the integrated circuit, is preferably of the type having a collector-base junction and a collector-substrate junction which both contribute to the photocurrent.

The integrated circuit includes an amplifying portion which comprises an input current amplifier 20 and an output transimpedance amplifier 40. The remaining integrated circuit components, designated 16, 18 and 19, comprise a pair of current sources and a voltage supply, respectively, which function to bias the amplifiers and which make the gain and DC output signal level of the integrated circuit relatively independent of the external supply voltage. The biasing circuitry is connected to an external, isolated, low current, low voltage DC power supply 14.

The photocurrent generated by photodiode 12 in response to the optical signal is received by the input current amplifier circuit at the base of a transistor 22 which has its collector connected to its base by a resistor 24 and its emitter joined to ground. A DC bias resistor 26, connected between the base of transistor 22 and ground, allows transistor 22 to operate in a more linear mode. Transistor 22, with resistor 24, functions as a transimpedance amplifier by providing a voltage signal corresponding to the applied photocurrent.

The voltage signal derived at the collector of transistor 22 is DC level shifted by means of a transistor 28 and is applied to the base of a buffer transistor 30. The emitter of transistor 28 is connected to the collector of transistor 22 and its base and collector are connected in common to the base of transistor 30 and to current source 16. The collector of transistor 30 is connecte'd to internal voltage supply 19. The voltage signal from the emitter of transistor 30 is applied across a resistor 32 to a current mirror comprising transistors 34 and 36. Thus, the level-shifted voltage signal is converted to an amplified photocurrent.

The base and collector of transistor 34 are connected in common to the base of transistor 36 and through resistor 32 to the emitter of transistor 30. The emitter of transistor 34 is connected to the emitter of transistor 36 and to ground. The amplified photocurrent is provided at the collector of transistor 36 which constitutes the output of amplifier 20.

The amplified photocurrent from input amplifier 20 is summed with a DC bias current from current source 16 at a node 37 to develop a difference current signal which is applied to an output transimpedance amplifier 40, specifically to the base of a transistor 42. The emitter of transistor 42 is grounded through a resistor 44. Its collector is coupled to a current source 18, as well as to its own base through a capacitor 46. The latter functions to provide high frequency stability in amplifier circuit 40. Transistor 42 forms a transimpedance amplifier with a transistor 48 and a feedback resistor 50 to provide an output voltage in response to the current signal applied to the base of transistor 42. The base of transistor 48 is connected to the collector of transistor 42 and to current source 18 and its collector is connected directly to power supply 14. A resistor 52 is connected between ground and the emitter of transistor 48. Feedback resistor 50 is connected between the base of transistor 42 and the emitter of transistor 48.

A transistor 54 functions as an output buffer and has its base connected to the emitter of transistor 48 to receive the output voltage. The collector of transistor 54 is connected to power supply 14, while its emitter is connected by way of a resistor 56 to an output terminal 62, to which a signal receiving system is to be connected. Resistor 56, a resistor 58 and a transistor 60 comprise an overcurrent limiter which limits the level of the output signal of integrated circuit 6. The base of transistor 60 is connected to the emitter of transistor 54, and resistor 58 is connected between output terminal 62 and the emitter of transistor 60. The collector of transistor 60 is coupled to the base of transistor 48.

The overall performance of amplifiers 20 and 40 of integrated circuit 6 is that of transimpedance amplification, such that a given photocurrent at the output of photodiode 12 produces a proportional output voltage at output terminal 62. The integrated circuit has a wideband frequency response because it minimizes the voltage changes at various nodes in the circuit, particularly across the photodiode which has a large shunt capacitance.

Amplifiers 20 and 40 exhibit a high degree of stability and linearity, in part because the resistances in each of the two circuits track each other. Specifically, resistors 24, 26 and 32 in amplifier 20 and a resistor 17 in current source 16 are all implant resistors having the nominal values given below. However, the actual resistance values may change during operation, primarily due to heating of integrated circuit 6. Since the resistors in current amplifier 20 are formed in a substantially identical manner, they will react in substantially the same way to a temperature change, i.e. the different resistance values will track each other. Accordingly, the overall gain of the input current amplifier will remain constant.

Resistors 44, 50, 52 and 58 of output transimpedance amplifier 40 are base diffusion resistors and also track each other. It should be noted that resistors of amplifiers 20 and 40 could be either implant or base diffusion resistors and that the types of resistors selected for the preferred embodiment are based on their physical size which is related to the resistance values. The values of these components of amplifier 40 are chosen so that the amplifier gain is proportional to the value of resistor 50, i.e. $V_{out} = R_{50} \times I_{in}$. As in the case of the resistive components of amplifier 20, the absolute value of resistor 50 increases with a temperature rise of integrated circuit 6. Since the integrated circuit and photodiode 10 are part of the same package, they are subject to similar temperature changes. Thus, resistor 50 is selected so that the change in its resistance value will at least partially compensate for the reduced efficiency of light emitting diode 10 with increasing temperature.

Set forth below are nominal values for the components of integrated circuit 6:

| | | |
|---|---|---|
| Resistor | 26 | 50,000 ohm |
| | 24 | 7200 |
| | 32 | 400 |
| | 17 | 2400 |
| | 50 | 12,500 |
| | 44 | 700 |
| | 52 | 1000 |
| | 58 | 200 |
| | 56 | 5 |
| Capacitor | 46 | .25 pF |

The video coupler described above lends itself to different types of applications. It can function as either an input coupler which can be driven directly by a standard video signal or as an output driver which delivers a standard video signal. Alternatively, the video coupler can be used with other video equipment, such as a video cassette recorder. Additionally, the coupler can be used with any wideband analog signal similar to a video signal where optical isolation is required.

While the present invention has been shown and described with reference to a preferred embodiment, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. A wideband optical isolator for coupling a wideband analog signal from a signal source system to a signal receiving system while providing high effective electrical isolation therebetween;
said isolator comprising:
a high-speed, light-emitting diode for converting said wideband analog signal to an optical signal;
a high-speed monolithic linear integrated circuit;
means substantially transparent to said optical signal for electrically isolating said light-emitting diode from said itegrated circuit;
a high-speed photodiode integral to said monolithic linear integrated circuit positioned to receive said optical signal through said electrical isolation means, said photodiode being adapted to provide a photocurrent representative of said converted analog signal;
an input current amplifier integral to said monolithic linear integrated circuit direct current connected to said photodiode, said input amplifier including a signal amplifying and level shifting stage and a current mirror, all direct current connected, for amplifying said photocurrent; and
an output transimpedance amplifier integral to said integrated circuit direct current connected between said input current amplifier and said signal receiving system and being responsive to said amplified photocurrent to provide an output voltage proportional to the latter.

2. An opticl isolator according to claim 1 wherein said widband analog signal contitutes a wideband video signal.

3. A wideband opticla isolator for coupling a wideband analog signal from a signal source system to a signal receiving system while providing high effective electrical isolation therebetween;
said isolator comprising:
a high-speed, light-emitting diode for converting said wideband analog signal to an optical signal;
a high-speed linear integrated circuit;
means substantially transparent to said optical signal for electrically isolating said light-emitting diode from said integrated circuit;
a high-speed photodiode in said integrated cirucit positioned to receive said optical signal through said electrocal isolation means, said photodiode being adapted to provide a photocurrent representative of said converted analog signal;
an input current amplifier in said integrated circuit for amplifying said photocurrent comprising:
(a) an input transistor having a first resistor coupled between its base and its collector for providing a voltage signal proportional to said photocurrent;
(b) a second resistor coupled between the base of said input transisor and ground and adapted to provide a DC bias for said input transistor;
(c) a DC level shifter coupled ot output of said input transistor for providing a level-shifted voltage signal;
(d) a buffer transistor connected to the output of said level shifter;
(e) a current mirror adapted to provide said amplified photocurrent at its output;
(f) a third resistor coupled between the emitter of said buffer transistor and said current mirror;
(g) said third resistor being adapted to provide a current proportional to said level-shifted voltage signal; and
an output transimpedance amplifier in said integrated circuit electrically coupled between said input current amplifier and said signal receiving system and being responsive to said amplified photocurrent to provide an output voltage proportional to the latter.

4. An optical isolator according to claim 3 wherein said output transimpedance amplifier comprises:
a first transistor having its base coupled to the output of said current mirror;
a second transistor having its base coupled to the collector of said first transistor;
a fourth resistor coupled to feed back a signal between the emitter of said second transistor and the base of said first transistor, said fourth resistor being selected to compensate at least in part for any reduciton in the efficiency of said light emitting diode caused by heating;
a fifth resistor coupled between the emitter of said first transistor and ground;
a sixth resistor coupled between the emitter of said second transistor and ground;
an overcurrent limiter;
an output buffer coupled between said second transistor and said overcurrent limiter;
said overcurrent limiter being coupled between said output buffer and an output terminal connected to said signal receiving system and being adapted to limit the level of said output voltage at said output terminal; and
said overcurrent limiter including a third transistor and a seventh resistor, said seventh resistor being coupled between the emitter of said third transistor and said output terminal.

5. An optical isolator according to claim 4 wherein said first, second and third resistors in said input current amplifier and implant resistors adapted to track each other as their resistance values change due to heating of said integrated circuit; and
wherein said fourth, fifth, sixth and seventh resistors in said output transimpedance amplifier are base diffusion resistors adapted to track each other as their resistance values change due to heating of said integrated circuit;
whereby said integrated circuit exhibits a high degree of stability and linearity.

6. A wideband optical isolator for coupling a wideband analog signal from a signal source system to a signal receiving system while providing high effective electrical isolation therebetween;
said isolator comprising:
a high-speed, light-emitting diode for converting said wideband analog signal to an optical signal;
a high-speed, linear integrated circuit;
means substantially transparent to said optical signal for electrically isolating said light-emitting diode from said integrated circuit;
a high-speed photodiode in said integrated circuit positioned to receive said optical signal through said electrical isolation means, said photodiode being adapted to provide a photocurrent respresentative of said converted analog signal;
an input current amplifier in said integrated circuit for amplifying said photocurrent, said input current amplifier comprising:
(a) an input transistor having a first resistor coupled between its base and its collector for providing a voltage signal proportional to said photocurrent;

(b) a second resistor coupled between the base of said input transistor and ground and adapted to provide a DC bias for said input transistor;
(c) a DC level shifter coupled to the output of said input transistor for providing a level-shifted voltage signal;
(d) a buffer transistor connected to the output of said level shifter;
(e) a current mirror adapted to provide said amplified photocurrent at its output;
(f) a third resistor coupled between the emitter of said buffer transistor and said current mirror; and
(g) said third resistor being adapted to provide a current proportional to said level-shifted voltage signal; and an output transimpedance amplifier in said integrated circuit electrically coupled between said input current amplifier and said signal receiving system and being responsive to said amplified photocurrent to provide an output voltage proportional to the latter.

7. An optical isolator according to claim 6 wherein said output transimpedance amplifier comprises:
a first transistor having its base coupled to the output of said current mirror;
a second transistor having its base coupled to the collector of said first transistor;
a fourth resistor coupled to feed back a signal between the emitter of said second transistor and the base of said first transistor, said fourth resistor being selected to compensate at least in part for any reduction in the effficiency of said light emitting diode caused by heating;
a fifth resistor coupled between the emitter of said first transistor and ground;
a sixth resistor coupled between the emitter of said second transistor and ground;
an overcurrent limiter;
an output buffer coupled between said second transistor and said overcurrent limiter;
said overcurrent limiter being coupled between said output buffer and an output terminal connected to said signal receiving system and being adapted to limit the level of said output voltage at said output terminal; and
said overcurrent limiter including a third transistor and a seventh resistor, said seventh resistor being coupled between the emitter of said third transistor and said output terminal.

8. An optical isolator according to claim 7 wherein said first, second and third resistors in said input current amplifier are implant resistors adapted to track each otehr as their resistance values change due to heating of said integrated circuit; and
wherein said fourth, fifth, sixth and seventh resistors in said output transimpedance amplifier are base diffusion resistors adapted to track each other as their resistance values change due to heating of said integrated circuit;
whereby said integrated circuit exhibits a high degree of stability and linearity.

* * * * *